Nov. 24, 1931.    A. E. NORRIS    1,833,032
TRACTOR
Filed Sept. 21, 1927    7 Sheets-Sheet 1

Fig.1.

Inventor:
Almon E. Norris,
Attys.

Nov. 24, 1931. A. E. NORRIS 1,833,032
TRACTOR
Filed Sept. 21, 1927 7 Sheets-Sheet 2

Patented Nov. 24, 1931

1,833,032

UNITED STATES PATENT OFFICE

ALMON E. NORRIS, OF BROOKLINE, MASSACHUSETTS

TRACTOR

Application filed September 21, 1927. Serial No. 220,944.

This invention relates to tractors of the track-laying type, having a rotating turntable, or platform, generally employed for supporting excavating and load-handling machinery.

The invention will be best understood by reference to the following description, when taken in connection with the accompanying drawings of one specific embodiment thereof, while its scope will be more particularly pointed out in the appended claims.

In the drawings:

Fig. 3 is a sectional view on line 3—3 of Fig. 2;

Referring to the drawings, and to the embodiment of the invention which has been selected for exemplification, the machine comprises generally a travelling base or substructure, and a rotatable turntable, or superstructure, mounted thereon to turn about a vertical axis. Referring to Fig. 3, the turntable comprises a platform 20 of generally rectangular form, having a suitable framework, herein including two parallel channel bars 21, a marginal frame including angle bars 22, and a flooring, such as plates 23 supported on said bars. The framework also includes a frame, herein conveniently in the form of a casting 24, interposed between the channel bars 21 and suitably secured thereto as by bolts 25. This casting is of irregular form, and presents numerous bearings, to which reference will be made from time to time in the following description.

The travelling base has a suitable framework, herein comprising two pairs of longitudinal bars 26, the bars of each pair being surmounted and united by horizontal plates 27. Superimposed upon these plates are pairs of longitudinal bars 28, and superimposed upon and uniting these bars is a plate 29. The bars 26 and 28 on one side of the machine are connected to the bars 26 and 28 on the other side by transverse bars 30 and the plate 29 (see Fig. 3), the latter carrying a transverse bar 31 (see Fig. 2). Other transverse bars 32 and 33 (see Fig. 2) and longitudinal bars 34 and 35 (see Fig. 3) are carried by bars 30 and plate 29 and are surmounted by a plate 36.

Figure 2:
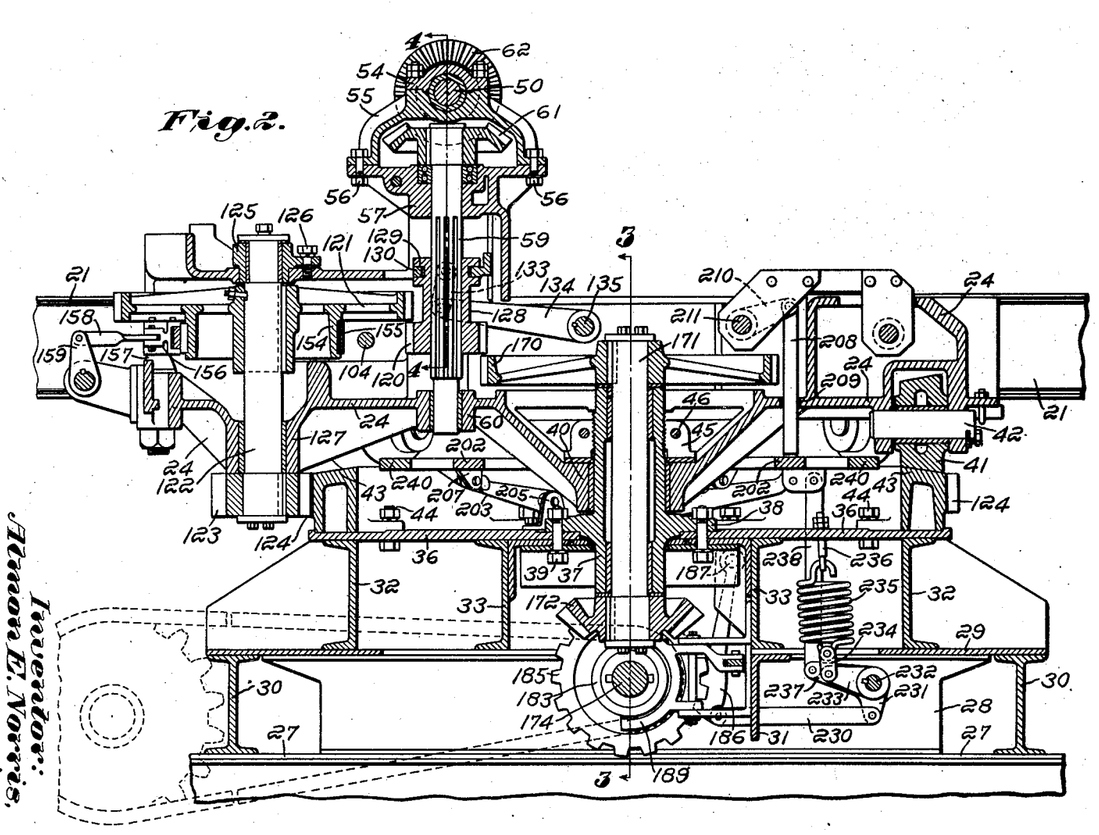
Fig. 2 is a sectional view, on an enlarged scale, on line 2—2 of Fig. 1.

Referring now to Fig. 2, the turntable is pivotally mounted on the travelling base by providing the latter with a vertical pivot, herein a sleeve 37, appropriately secured to the plate 36 by being provided with a flange 38 secured thereto as by bolts 39. This sleeve extends upwardly through a bearing 40, presented by the frame 24 of the turntable. The weight of the turntable, however, is sustained by a series of tapered rollers 41, mounted to turn on pins 42 carried by the frame 24, said rollers resting upon a track presented by a ring 43, suitably secured as by bolts 44 to the plate 36. A collar 45, threaded on and about the sleeve 37, normally prevents upward displacement of the turntable with relation to the travelling base, but when it is desired to lift the turntable from the base, this can readily be accomplished by unscrewing the collar in an upward direction. Herein, the collar is split, and is provided with clamping screws or bolts 46, to clamp the same about the sleeve.

Figure 1:
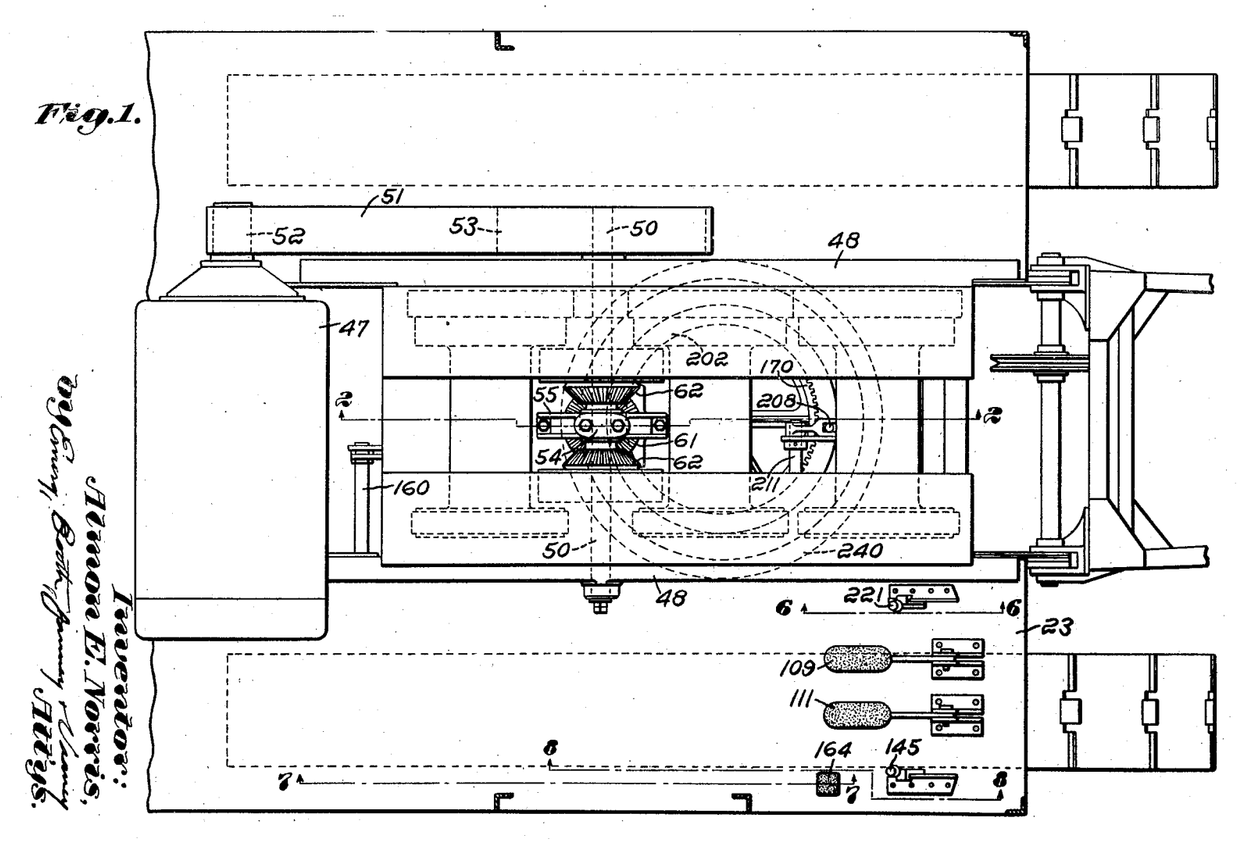
Fig. 1 is a plan of a tractor exemplifying the invention.
Figure 4:
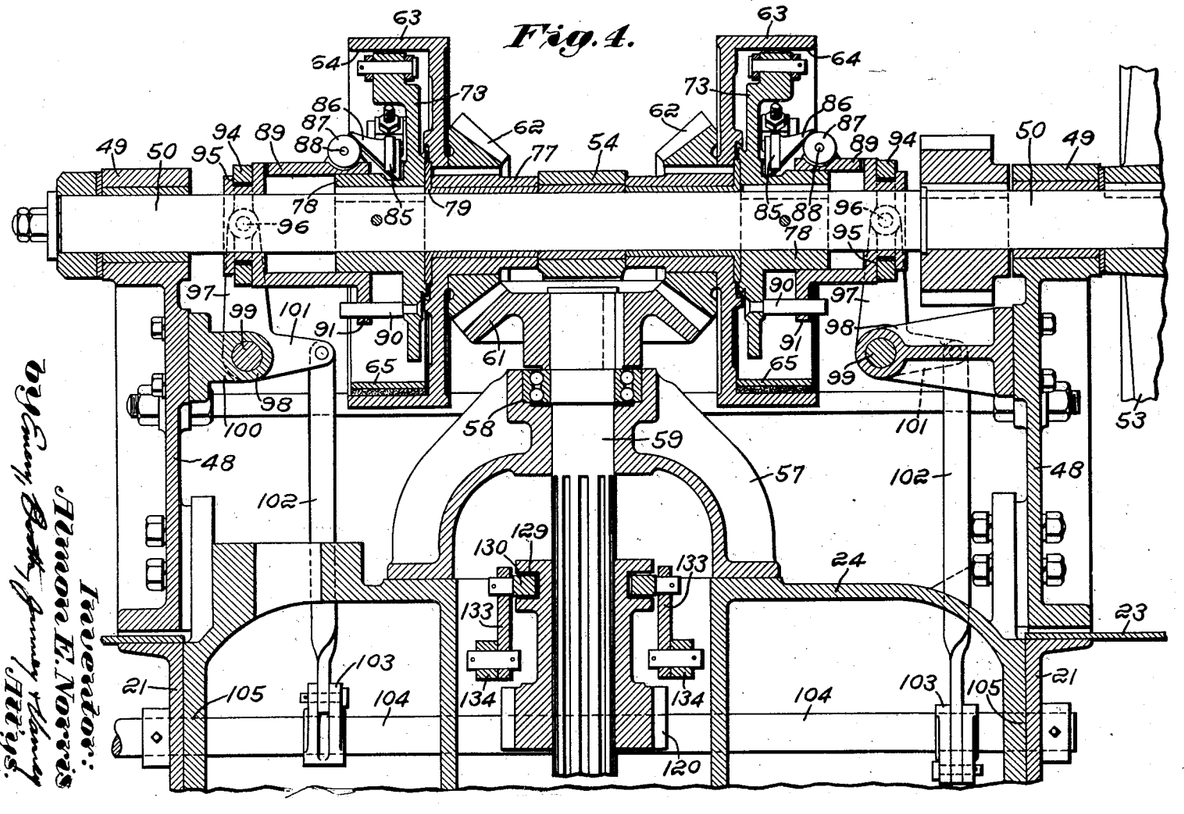
Fig. 4 is a sectional view, on a still further enlarged scale, on line 4—4 of Fig. 2.

Referring now to Fig. 1, the turntable supports a source of power, such as an internal combustion engine 47, from which power is derived for accomplishing the propelling and steering of the travelling base, the rotation of the turntable thereon, and the driving of the various drums used in connection with the usual excavating and load-handling device. The usual hoisting machine mounted on the turntable has a framework comprising side frames 48, which, as shown in Fig. 4, present bearings 49 for a main shaft 50, suitably driven by the motor, as by means of a silent chain 51 (see Fig. 1) and sprockets 52 and 53. The shaft 50 has also a center bearing 54, presented by a yoke-like bracket 55, best shown in Fig. 2, said bracket, in turn, being secured as by bolts 56 to a second yoke-like bracket 57, which, as shown in Fig. 4, is supported by the frame 24. The bracket 57 supports a bearing 58 for the upper portion of a vertical shaft 59, whose lower end is received in a bearing 60 (see Fig. 2) presented by the frame 24.

The vertical shaft 59 may be driven in either direction at will by mechanism now to be described, reference being had to Fig. 4. Keyed on the upper end of the shaft 59 is a bevel gear 61, meshing with bevel pinions 62, which are loosely mounted on the horizontal main driving shaft 50. Power may be applied to these pinions separately by clutches such as those now to be described.

Figure 13:
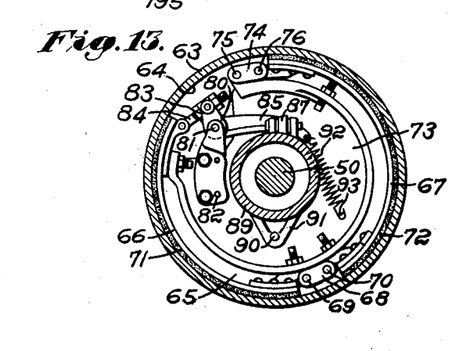
Fig. 13 is a vertical, sectional view, illustrating one of the main clutches.

Each clutch comprises a rotatable drum 63, having an internal circumferential friction surface 64, which encircles an expansible and contractible friction band 65, the latter, as shown in Fig. 13, being composed of two sections or shoes 66 and 67, flexibly connected to each other as by a link or links 68 and pivots 69 and 70. The shoes are provided with linings or facings 71 and 72 of appropriate material, such as asbestos, secured thereto. The band is carried by an appropriate carrier 73, to which the band is suitably connected, as by a link or links 74, and pivots 75 and 76. Referring again to Fig. 4, the drum 63 presents a hub 77, to which the pinion 62 is keyed, and the band carrier presents a hub 78, which is keyed and pinned to the shaft 50. Between the two hubs, there is a thrust washer 79.

The band is expanded and contracted by mechanism now to be described, reference being had at first to Fig. 13. A band-operating lever 80 is fulcrumed on a pin 81 on a bracket 82, secured to the band carrier 73. The lever presents a pair of short arms 83, suitably connected, as by a link 84, to the adjacent end of the shoe 66. The band-operating lever has a long arm 85, which, as shown in Fig. 4, presents a cam 86 engaging a suitable cam-wiper, such as a roller 87, mounted to turn on and about a pin 88 on an axially slidable sleeve 89 mounted on the hub 78. The sleeve is prevented from turning with relation to the hub, as by means of a pin 90 secured to the band-carrier 73, and extending through an ear 91 presented by the sleeve 89. Referring to Fig. 13, the band is contracted by an appropriately arranged spring 92, herein having one end attached to the arm 85 of the lever, and its other end to a pin 93 attached to the band-carrier.

Referring again to Fig. 4, axial movement of the sleeve is conveniently effected by the use of a yoke 94 received in a groove 95 presented by the sleeve 89, said yoke being pivoted at 96 to one arm 97 of a bell-crank lever 98, which is fulcrumed on a pivot 99 on an appropriate support, such as a bracket 100 on the side frame 48. The lever has another arm 101, which is connected by a link 102 to an arm 103, the latter being secured to a rockshaft 104, mounted in bearings 105 presented by the frame 24.

The operation of the clutch will now be described, reference being had at first to Fig. 4. Axial movement of the sleeve 89 causes the cam roller 87 to move the cam 86 in an outward direction, thereby to rock the lever 85 about its fulcrum from the position shown in Fig. 13. The outward swinging movement of the short arm 83 of the lever, acting through the link 84, swings the adjacent end of the shoe 66 in an outward and tangential direction, and thus serves to expand the band into engagement with the internal circumferential surface 64 of the drum 63, thus driving the latter and consequently rotating the bevel pinion 62, which is secured thereto.

Referring once more to Fig. 4, both clutches are normally disengaged, but through the rockshaft 104, they are interconnected in such manner that either may be engaged to the exclusion of the other. This is accomplished by arranging the bell-crank levers 98 so that their arms 101 point in the same direction with reference to the pivots 99, on which said levers are fulcrumed. It follows that movement of one clutch sleeve 89 is accompanied by movement of the other clutch sleeve in the same direction. It should be understood, of course, that when one clutch is engaged, the vertical shaft 59 is rotated in one direction, and when the other clutch is engaged, said shaft is rotated in the opposite direction.

The mechanism for operating the rockshaft 104 will now be described, reference being had at first to Fig. 8. Two arms 106 and 107 are secured to the rockshaft 104, one of said arms pointing in an upward direction and the other in a downward direction, and one being connected by a link 108 to a pedal 109 (see Fig. 5), and the other by a link 110 to a pedal 111. Downward pressure on one pedal, therefore, rocks the shaft 104 in one direction, while downward pressure on the other pedal rocks said shaft in the opposite direction, one pedal rising as the other is depressed. The rockshaft is normally maintained in its neutral position, and is restored thereto, by appropriate means, herein a spring 112 (see Fig. 9), interposed between shoulders or collars 113, presented by two sleeves 114, slidably mounted on a rod 115, between abutments 116 on the latter. The spring constantly tends to urge the sleeves 114 in opposite directions against the abutments 116, respectively, and to maintain engagement of the shoulders 113 with fixed abutments 117 presented by brackets 118 secured to the under side of the plate 23.

Figures 6, 7, 8, 9:
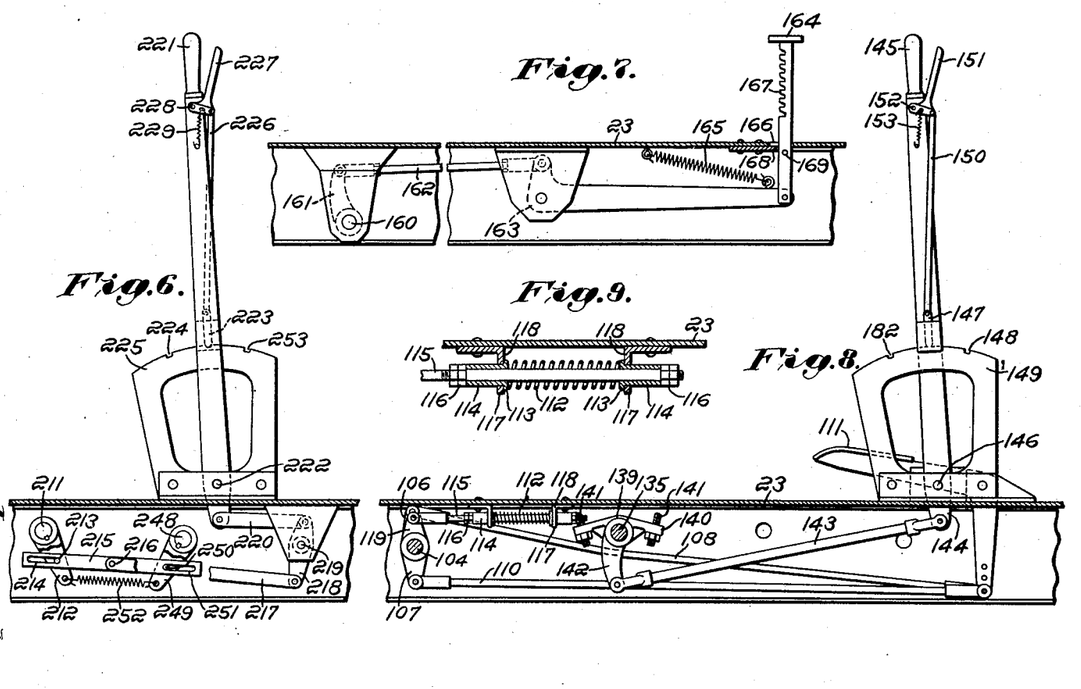
Fig. 6 is a sectional view, on an enlarged scale, on line 6—6 of Fig. 1.
Fig. 7 is a sectional view, on an enlarged scale, on line 7—7 of Fig. 1.
Fig. 8 is a sectional view, on an enlarged scale, on line 8—8 of Fig. 1.
Fig. 9 is a vertical, sectional view, on an enlarged scale, illustrating some of the parts shown in elevation in Fig. 8.

Referring now to Fig. 8, the rod 115 is pivotally connected to an arm 119 secured to the rockshaft 104. When, therefore, the shaft 104 is rocked in either direction from its normal position, one of the abutments 116 carried by the rod 115 will move the adjacent sleeve 114 in the proper direction to carry the shoulder 113 out of engagement with the fixed abutment 117, thereby compressing the spring 112. Thus, the spring will be compressed when the rod is moved in either direction. Accordingly, the spring will serve to restore the rock-shaft to its neutral position, when pressure is removed from either pedal.

Power is taken from the vertical shaft 59 to rotate the platform, as well as to cause the base to travel. Referring to Fig. 2, a pinion 120, splined on the shaft 59, is movable vertically thereon into and out of mesh with a gear 121, which is keyed on a vertical shaft 122, on which there is also keyed a pinion 123, which meshes with a ring gear 124 conveniently formed as an integral part of the track 43. The upper portion of the shaft 122 is mounted in a bearing 125, suitably secured, as by cap-screws 126, to the frame 24, and the lower portion of the shaft is mounted in a bearing 127 presented by said frame. When the pinion 120 is meshed with the gear 121, power is transmitted to the pinion 123 to cause rotation of the turntable about the axis of the pivotal sleeve 37.

Figure 5:
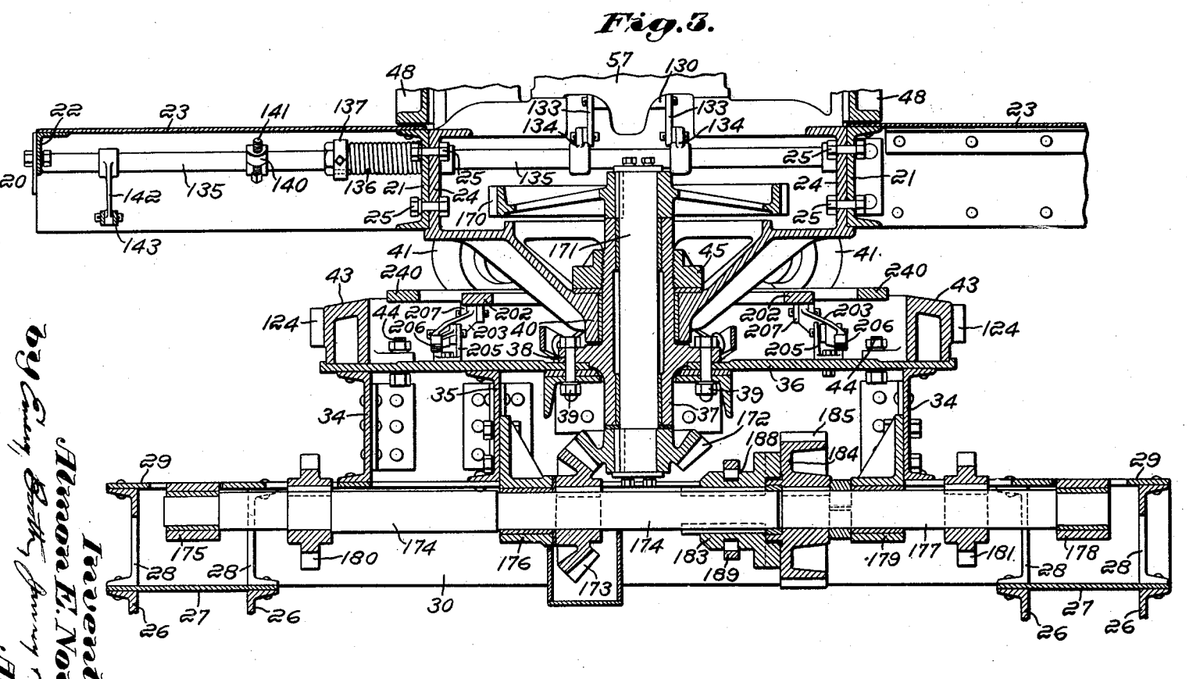
Fig. 5 is a skeletonized view, showing in plan various parts of the controlling mechanism.

Mechanism for shifting the pinion 120 will now be described, reference being had at first to Fig. 2. The pinion is provided with a hub 128, presenting a groove 129 which receives a yoke or collar 130, the latter, as shown in Fig. 5, presenting a groove 131, which receives a vertical tongue 132 presented by the bracket 57. By this means, the collar is guided in its vertical travel, and is held against rotation. The collar is moved vertically by two links 133, which connect the collar to two arms 134, which are secured to a rockshaft 135. To counterbalance the combined weight of these arms, the links, the collar and the pinion, there is provided a torsional spring 136, helically coiled about the rockshaft 135, one end of the spring being anchored in a collar 137, secured to said shaft, and the other end being anchored in a notch 138 presented by one of the bars 21.

Referring now to Fig. 8, rocking movement of the shaft and consequent vertical sliding movement of the pinion are limited by appropriate means, herein a lever 139, secured to the shaft, and presenting two arms 140, each of which carries a stop screw 141, adjustably mounted therein, and adapted to engage the under side of the plate 23. There is also secured to the rockshaft an arm 142, connected by a link 143 to an arm 144 of a hand lever 145, which is fulcrumed on a pivot 146. As a means to lock the lever in the position in which the pinion 120 is meshed with the gear 121, it is provided with a vertically slidable latch 147, adapted to enter a notch 148 in a sector 149. The latch is controlled by a link 150, connected to a finger lever 151 fulcrumed at 152 on the hand lever, a spring 153 being provided to urge the latch into engagement with the sector. When the hand lever is in the central position shown in Fig. 8, the pinion 120 is in the position shown in Fig. 2. To mesh the pinion 120 with the gear 121, the hand lever is moved toward the right (see Fig. 8), until the latch 147 enters the notch 148.

The brake for the turntable will now be described, reference being had at first to Fig. 2. The gear 121 presents a brake-drum 154, about which there is a band 155, which, as shown in Fig. 5, has its terminal portions pivotally connected to a brake lever 156 fulcrumed at 157 between its points of attachment to the band. This lever is connected by a link 158 to an arm 159, secured to a rockshaft 160, to which there is also secured an arm 161, best shown in Fig. 7. This arm is connected by a link 162 to one arm of a bell-crank lever 163, whose other arm is pivoted to a vertically slidable pedal 164, normally held in its uppermost position by a spring 165. The pedal shank extends through an opening 166 provided in the plate 23, and is provided with ratchet teeth 167, adapted to cooperate with a fixed plate 168 constituting a pawl secured to the under side of the plate 23. A pin 169, extending through the pedal shank 164 beneath the plate 23, serves to limit upward movement of the pedal. When the pedal is depressed to engage the brake, it is conveniently locked by engagement of one of the ratchet teeth with the pawl.

Mechanism for causing the travel of the base will now be described, reference being had at first to Fig. 2. The pinion 120 may be meshed with a gear 170, keyed to the upper end of a vertical shaft 171 mounted in bearings presented by the pivot sleeve 37. There is also keyed to the lower end of said shaft a bevel gear 172, which meshes with and drives a bevel gear 173 keyed to a horizontal shaft 174. Referring now to Fig. 3, the shaft 174 is mounted in bearings 175 and 176, and there is aligned with said shaft a shaft 177, which is mounted in bearings 178 and 179. Keyed to these two shafts, respectively, are sprockets 180 and 181. In practice, these sprockets are connected by chains to sprockets secured to axles which drive the self-laying tracks, but as these parts are old and well known, it is deemed unnecessary further to illustrate and describe the final driving mechanism.

Referring now to Fig. 8, when the hand lever 145 is moved from its central position toward the left, the pinion 120 (see Fig. 2) is moved into mesh with the gear 170, and it is held in mesh therewith by engagement of the latch 147 with a notch 182 presented by the sector 140. It will be remembered that the pinion 120 may be rotated in either direction. It follows that the shaft 174 (see Fig. 3) may be rotated in either direction. The shaft 174 may be coupled to the shaft 177 by a jaw clutch comprising a clutch member 183, splined on the shaft 174, and adapted to engage a clutch member 184 keyed on the shaft 177. When this clutch is engaged, the two shafts are driven as one, and of course both of the self-laying tracks are driven in the same direction and at the same speed. When, however, the clutch member 183 is disengaged from the clutch member 184, the shaft 174 only is rotated, and only one of the self-laying tracks is driven. Under such circumstances, the shaft 177 should be held against rotation. Also, when the base is not travelling, and the excavating or hoisting devices are at work, it is desirable to have both of the self-laying tracks held fixed. To these ends, therefore, there is provided an appropriate brake, herein a ratchet 185, conveniently formed on the clutch member 184, and adapted to be engaged by a pawl 186 (see Fig. 2), fulcrumed on a pivot 187.

Figure 10:
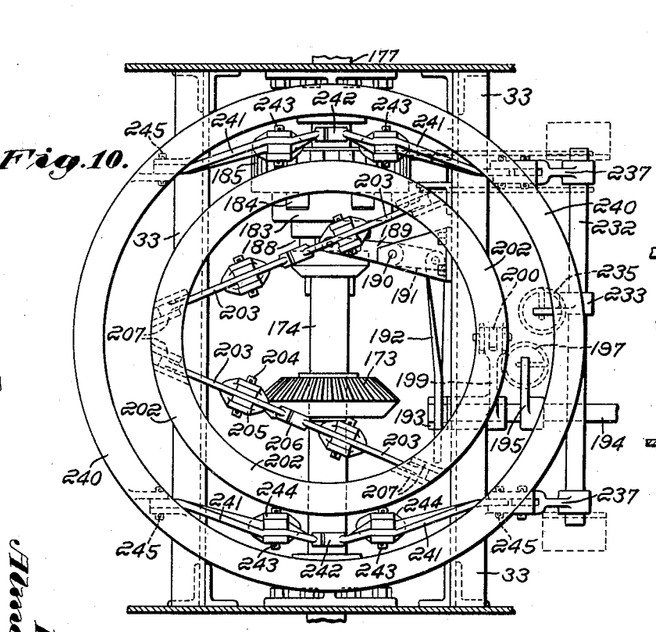
Fig. 10 is a skeletonized view in plan, illustrating a portion of the controlling mechanism.

The mechanism for sliding the clutch member 183 into and out of engagement with the clutch member 184 will now be described, reference being had at first to Fig. 3. The clutch member 183 is provided with an annular groove 188, which receives a clutch shifting yoke 189 (best shown in Fig. 10), fulcrumed on a pivot 190 on a bracket 191, and connected by a link 192 to an arm 193 (best shown in Fig 12), which is secured to a rockshaft 194. There is also secured to this rockshaft a second arm 195, connected by a link 196 to one end of a spring 197, whose other end is attached to a bolt 198 anchored in the plate 36. This spring constantly tends to engage the clutch, and to elevate the clutch-shifting ring now to be described.

There is also secured to the rockshaft 194 a third arm 199 connected by a link 200 to an ear 201 presented by a vertically movable clutch ring 202. The upper surface of this ring is maintained always in a horizontal plane, by two pairs of levers 203 (see Figs. 10 and 11), fulcrumed on pivots 204 in brackets 205, supported by the plate 36. The inner or adjacent ends of the levers of each pair have toothed engagement with each other, as at 206, after the fashion of gears while their outer ends are pivotally connected to pairs of ears 207, presented by the ring 202. The arrangement is such that downward pressure applied to the ring at any point causes the ring to be displaced downwardly, while maintaining its horizontal position. This fact is made use of in the actuation of the ring at any point in the swing of the turntable, it being possible thus to operate the clutch regardless of the position of the turntable with reference to the travelling base.

Figure 12:
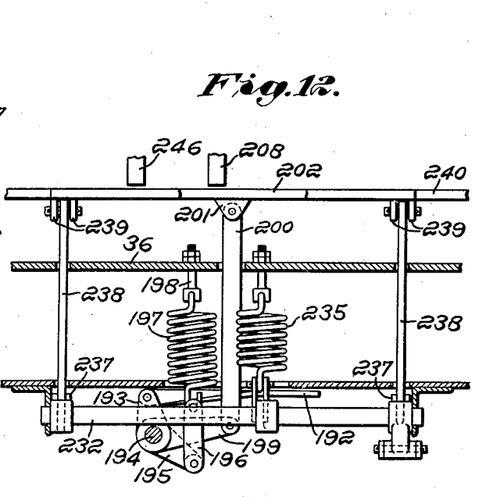
Fig. 12 is an elevation, partly in vertical section, of some of the parts shown in Fig. 10.

The mechanism for actuating the ring will now be described, reference being had at first to Fig. 2. A vertical plunger 208, having its lower end above and adjacent the ring, extends through and is guided by an opening 209 in the frame 24. The upper end of this plunger is pivoted to an arm 210, which is secured to a rockshaft 211. Referring now to Fig. 6, there is also secured to this rockshaft an arm 212, which carries a pin 213 working in a slot 214 presented by a link 215, which is pivoted at 216 to a link 217, the latter in turn being pivoted to one arm of a lever 218 fulcrumed at 219. The other arm of the lever is connected by a link 220 to a hand lever 221 fulcrumed on a pivot 222. When this lever is in the position shown in Fig. 6, the clutch is engaged. When this lever is moved toward the left, as viewed in Fig. 6, it acts through the link 220, lever 218, link 217, link 215, pin 213 and arm 212, to rock the shaft 211, thereby causing the arm 210 (see Fig. 2) and the plunger 208 to depress the ring 202. Referring now to Fig. 12, depression of the ring 202 acts through the link 200, arm 199, rockshaft 194, arm 193, link 192 and lever 189 (see Fig. 10) to move the clutch member 183 out of engagement with the clutch member 184. Referring again to Fig. 6, as a means to lock the hand lever 221 in the position in which the jaw clutch is disengaged, the lever is provided with a latch 223, adapted to be engaged with and disengaged from a notch 224 in a sector 225 by a link 226 connecting said latch to a finger lever 227 fulcrumed on a pivot 228 on the hand lever. A suitably arranged spring 229 constantly tends to urge the latch into engagement with the sector.

The mechanism for controlling the locking pawl 186 will now be described, reference being had at first to Fig. 2. The pawl is connected by a link 230 to an arm 231 secured to a rockshaft 232, to which there is also secured an arm 233, connected by a link 234 to one end of a spring 235, whose other end is secured to a bolt 236, which is anchored in the plate 36. This spring constantly tends to maintain the pawl 186 in engagement with the ratchet 185, and to maintain at a predetermined level the pawl-actuating ring now to be described.

Figure 11:
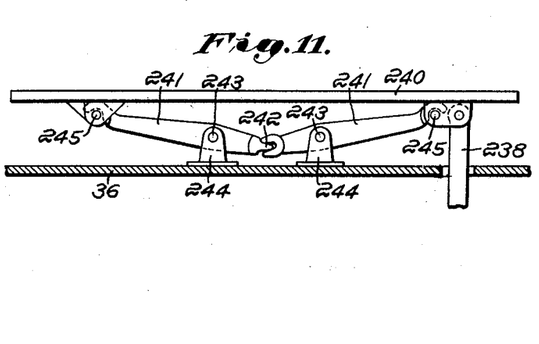
Fig. 11 is a side elevation, partly in vertical section, of some of the parts shown in Fig. 10.

There are also secured to the rockshaft 232 two arms 237, connected by two links 238 (best shown in Fig. 12) to pairs of ears 239 presented by a vertically movable pawl-actuating ring 240. Referring now to Fig. 11, this ring, like the clutch-actuating ring, is provided with means for maintaining it horizontally, while permitting its vertical displacement, such means comprising two pairs of levers 241, having toothed engagement with each other, as at 242, fulcrumed on pivots 243 on brackets 244, supported by the plate 36, the outer ends of said levers being pivotally connected at 245 to the ring 240.

Above and adjacent the upper surface of the pawl-actuating ring is the lower end of a plunger 246, which, as best shown in Fig. 5, is pivotally attached at its upper end to an arm 247 secured to a rockshaft 248. Referring now to Fig. 6, there is also secured to this rockshaft an arm 249, carrying a pin 250, which works in a slot 251 provided in the link 215, which was described in connection with the clutch-actuating ring. A spring 252, connecting the arm 249 to the arm 212, tends to maintain the pin 250 in the left-hand end of the slot 251, and the pin 213 in the right-hand end of the slot 214. This spring, therefore, tends to keep both of the plungers 208 and 246 out of engagement with their respective rings 202 and 240 (see Fig. 5).

Referring again to Fig. 6, when the hand lever 221 is in the neutral position shown therein, the clutch and pawl-actuating rings are at the same level, the jaw clutch is engaged, and the pawl is engaged with the ratchet. When the hand lever is moved toward the right, the clutch remains in engagement, but the pawl is disengaged from the ratchet, and in this position, the lever may be locked by engagement of the latch 223 with a notch 253 provided in the sector 225. When the hand lever is moved to this position, it acts through the link 220, lever 218, link 217, link 215, pin 250 and arm 249, to turn the rockshaft 248. Referring now to Fig. 5, this causes the arm 247 to lower the plunger 246, and to depress the pawl-actuating ring 240. Referring now to Fig. 2, depression of the ring 240 acts through the links 238, arms 237, arm 231 and link 230, to withdraw the pawl 186 from engagement with the ratchet 185.

Referring again to Fig. 6, it should now be apparent that when the hand lever 221 is moved from its neutral position toward the right, the pawl is disengaged from the ratchet, while the clutch is left in engagement; and on the other hand, if the lever is moved toward the left from its neutral position, the clutch is disengaged, while the pawl is left in engagement. This is accomplished by reason of the fact that each of the arms 212 and 249 has a lost motion connection with the link 215.

The general operation of the machine will now be described, reference being had to Fig. 1. In practice, there is provided a seat (not shown herein), on which the operator sits with his left foot on the pedal 109, with his right foot on the pedal 111, with his left hand grasping the lever 221, and with his right hand grasping the lever 145. Assuming that the brake pedal 164 which controls the turntable brake is elevated and the brake released, rotation of the turntable is accomplished by first moving the hand lever 145 forward. This slides the gear 120 (see Fig. 2) into mesh with the gear 121. Then, by depressing the pedal 109, one of the friction clutches is engaged, and the turntable is rotated in one direction. Pressure on the other pedal causes rotation of the turntable in the opposite direction. The interconnection between the pedals compels them to be operated alternatively. Rotation of the turntable is stopped by depression of the brake pedal 164 with the right foot. After the turntable has been rotated to the desired position, and is held therein by the turntable brake, the hand lever 145 is then restored to its neutral position.

When the operator wishes to cause the machine to travel, he pulls the hand lever 145 toward him, thus causing the pinion 120 (see Fig. 2) to slide into mesh with the gear 170. If he wishes the machine to be driven in a straight path by the operation of both self-laying tracks, he moves the hand lever 221 forward, thus disengaging the pawl from the ratchet, while leaving the jaw clutch engaged (now see Fig. 3). Under these circumstances, the shafts 174 and 177 are coupled together by the jaw clutch. Power can now be applied to both of these shafts as a unit, and both of the self-laying tracks can be driven in one direction or the other by depressing either of the pedals 109 and 111, as the case may be, depression of one causing the machine to go forward, and depression of the other causing it to go backward.

If the operator wishes to turn the machine by the operation of one of the self-laying tracks alone, he first moves the hand lever 221 toward him. This movement, it will be remembered, leaves the pawl in engagement with the ratchet, but disengages the jaw clutch. Under these circumstances, the pawl and ratchet lock the other shaft 177 (see Fig. 3) against rotation, and therefore lock the corresponding self-laying track against movement. This leaves the long shaft 174 free to be rotated by the driving mechanism, and this can be accomplished by simply depressing either of the pedals 109 or 111, thereby causing the remaining self-laying track to be driven in one direction or the other, according to which of the two pedals has been depressed. This causes the machine to be swung bodily in either direction.

Having thus described one embodiment of the invention, but without limiting myself thereto, what I claim and desire by Letters Patent to secure is:

1. In a machine of the class described, the combination of two frames, one mounted on the other to rotate about a vertical axis, traction mechanism including traction members supporting the lower frame, mechanism including a vertical operating shaft for operating said traction mechanism, the axis of said shaft being coincident with said vertical axis, and controlling mechanism for controlling said traction mechanism, said controlling mechanism including a ring disposed about said axis, means independent of said shaft supporting and guiding said ring entirely on one of said frames and having provision for permitting displacement of said ring lengthwise of said axis while maintaining said ring perpendicular to said axis throughout the turning movement of said rotatable frame, and a ring actuator supported by the other frame and engageable with said ring throughout the turning movement of the rotatable frame to displace said ring vertically.

2. In a machine of the class described, the combination of two frames, one mounted on the other to rotate about a vertical axis, traction mechanism which carries the lower frame, said traction mechanism including a clutch, mechanism including a vertical operating shaft for operating said traction mechanism, the axis of said shaft being coincident with said vertical axis, and controlling mechanism for controlling said clutch, said controlling mechanism including a ring disposed about said axis, means independent of said shaft supporting and guiding said ring entirely on one of said frames and having provision for permitting displacement of said ring lengthwise of said axis while maintaining said ring perpendicular to said axis throughout the turning movement of said rotatable frame, and a ring actuator supported by the other frame and engageable with said ring throughout the turning movement of the rotatable frame to displace said ring vertically.

3. In a machine of the class described, the combination of two frames, one pivoted on the other to rotate about a vertical axis, traction mechanism including two traction members supporting the lower frame, and controlling mechanism for controlling said traction mechanism, said controlling mechanism including a ring disposed about said axis, means comprising interconnected levers for compelling said ring always to remain perpendicular to said axis and to prevent said ring from turning with relation to one of said frames while permitting displacement of said ring lengthwise of said axis, and a ring actuator supported by the other frame and engageable with said ring throughout turning movement of said rotatable frame to displace said ring lengthwise of said axis.

4. In a machine of the class described, the combination of two frames, one pivoted on the other to rotate about a vertical axis, traction mechanism including two traction members supporting the lower frame, and controlling mechanism for controlling said traction mechanism, said controlling mechanism including a ring disposed about said axis, means comprising interconnected levers for compelling said ring always to remain perpendicular to said axis and to prevent said ring from turning with relation to one of said frames while permitting displacement of said ring lengthwise of said axis, a ring actuator supported by the other frame and engageable with said ring throughout turning movement of said rotatable frame to displace said ring lengthwise of said axis and yielding means urging said ring toward said member.

5. In a machine of the class described, the combination of two frames, one pivoted upon the other to rotate about a vertical axis, a horizontal, driving shaft, a vertical, driven shaft, mechanism for driving said vertical shaft from said horizontal shaft, said mechanism including two driving, bevel gears loosely mounted on said horizontal shaft and a driven, bevel gear secured to said vertical shaft and meshing with said driving gears, the upper frame presenting a bearing for said horizontal shaft between said driving gears and above said driven gear, and a bearing for said vertical shaft below said driven gear, and propelling mechanism driven by said vertical shaft.

6. In a machine of the class described, the combination of two frames, one pivoted upon the other to rotate about a vertical axis, a horizontal, driving shaft, a vertical driven shaft, mechanism for driving said vertical shaft from said horizontal shaft, said mechanism including two driving, bevel gears loosely mounted on said horizontal shaft and a driven, bevel gear secured to said vertical shaft and meshing with said driving gears, the upper frame including a yoke-like bracket presenting a bearing for said horizontal shaft between said driving gears and above said driven gear, a yoke-like bracket supporting the first-mentioned bracket and presenting a bearing for said vertical shaft below said driven gear, and propelling mechanism driven by said vertical shaft.

7. In a machine of the class described, the combination of two frames, one pivoted upon the other to rotate about a vertical axis, mechanism for rotating the upper frame about said axis, mechanism for propelling the lower frame along the ground, instrumentalities for transmitting power to either of said mechanisms, said instrumentalities including a driving shaft, a driven shaft, mechanism including two clutches for causing said driving shaft to rotate said driven shaft in either direction, two clutch actuators, and means connecting said actuators to said clutches and to each other to engage either of said clutches to the exclusion of the other, three gears mounted to rotate about vertical axes, one of said gears being splined on said driven shaft, and means for moving such gear upwardly into mesh with one of the other two gears, and downwardly into mesh with the second of said other two gears.

8. In a machine of the class described, the combination of two frames, one pivoted upon the other to turn about a vertical axis, means for rotating the upper frame about said axis, propelling means including two traction members and a clutch for connecting said members together and driving them in unison, means including a stop device for locking one of said traction members and one of the clutch members against movement, and means for controlling said clutch and said stop device, the last-mentioned means having provision for causing engagement of said clutch and said stop device at the same time or engagement of said stop device while said clutch is disengaged, or engagement of said clutch while said stop device is disengaged.

9. In a machine of the class described, the combination of two frames, one pivoted upon the other to turn about a vertical axis, means for rotating the upper frame about said axis, propelling means including two traction members and a clutch comprising two clutch members for connecting said traction members together and driving them in unison, means including a stop device for locking one of said traction members and one of the clutch members against movement, and means for controlling said clutch and said stop device, the last-mentioned means including lost-motion devices for permitting engagement of said clutch and said stop device at the same time, or engagement of said stop device while said clutch is disengaged, or engagement of said clutch while said stop device is disengaged.

10. In a machine of the class described, the combination of two frames, one supported by the other to rotate about a vertical axis, traction mechanism including traction members supporting the lower frame, mechanism including a vertical operating shaft for operating said traction mechanism, the axis of said shaft being coincident with said vertical axis, and controlling mechanism including a ring disposed about said axis, means independent of said shaft supported by said lower frame and supporting said ring entirely on said lower frame and having provision for maintaining said ring perpendicular with said axis throughout the turning movement of said rotatable frame, while permitting said ring to move axially, and a ring actuator supported by the upper frame and engageable with said ring throughout the turning movement of the upper frame to displace said ring vertically.

11. In a machine of the class described, the combination of two frames, one supported by the other to rotate about a vertical axis, traction mechanism including traction members supporting the lower frame, mechanism including a vertical operating shaft for operating said traction mechanism, the axis of said shaft being coincident with said vertical axis, and controlling mechanism including a ring disposed about said axis, a parallel motion mechanism independent of said shaft supported by said lower frame and supporting and guiding said ring to cause the same to remain perpendicular with said axis throughout the turning movement of said rotatable frame while permitting said ring to move axially, and a ring actuator supported by the upper frame and engageable with said ring throughout the turning movement of the upper frame to displace said ring vertically.

12. In a machine of the class described, the combination of two frames, one supported by the other to rotate about a vertical axis, traction mechanism including traction members supporting the lower frame, mechanism including a vertical operating shaft for operating said traction mechanism, the axis of said shaft being coincident with said vertical axis, and controlling mechanism including a ring disposed about said axis, means independent of said shaft supported by said lower frame and supporting said ring entirely on said lower frame and having provision for maintaining said ring perpendicular with said axis throughout the turning movement of said rotatable frame, while permitting said ring to move axially, and a ring actuator supported by the upper frame and engageable with the upper face of said ring throughout the turning movement of the upper frame to displace said ring vertically.

13. In a machine of the class described, the combination of two frames, one supported by the other to rotate about a vertical axis, traction mechanism including traction members supporting the lower frame, mechanism including a vertical operating shaft for operating said traction mechanism, the axis of said shaft being coincident with said vertical axis, and controlling mechanism including a ring disposed about said axis, means independent of said shaft supported by said lower frame and supporting said ring entirely on said lower frame and having provision for maintaining said ring perpendicular with said axis throughout the turning movement of said rotatable frame, while permitting said ring to move axially, and a ring actuator supported by the upper frame and engageable with but unattached to said ring throughout the turning movement of the upper frame to displace said ring vertically.

In testimony whereof, I have signed my name to this specification.

ALMON E. NORRIS.